US011516240B2

(12) United States Patent
Tan et al.

(10) Patent No.: US 11,516,240 B2
(45) Date of Patent: Nov. 29, 2022

(54) DETECTION OF ANOMALIES ASSOCIATED WITH FRAUDULENT ACCESS TO A SERVICE PLATFORM

(71) Applicant: Capital One Services, LLC, McLean, VA (US)

(72) Inventors: Bozhao Tan, Sunnyvale, CA (US); Vikash Tiwari, Henrico, VA (US); Fedor Dzegilenko, San Jose, CA (US); Ashish Gupta, Richmond, VA (US); Jeffrey Michel, Henrico, VA (US); Jonathan Weimer, Henrico, VA (US); Meenakshi Panda, Richmond, VA (US); Vinayak Hulawale, Henrico, VA (US); Rohit Joshi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 17/136,975

(22) Filed: Dec. 29, 2020

(65) Prior Publication Data

US 2022/0210172 A1    Jun. 30, 2022

(51) Int. Cl.
| | |
|---|---|
| *H04L 29/06* | (2006.01) |
| *H04L 29/08* | (2006.01) |
| *G06N 5/00* | (2006.01) |
| *H04L 9/40* | (2022.01) |
| *H04L 67/133* | (2022.01) |
| *H04L 67/50* | (2022.01) |

(52) U.S. Cl.
CPC ......... *H04L 63/1425* (2013.01); *G06N 5/003* (2013.01); *H04L 63/0236* (2013.01); *H04L 67/133* (2022.05); *H04L 67/535* (2022.05)

(58) Field of Classification Search
CPC .............. H04L 63/1425; H04L 67/133; H04L 63/0236; G06N 5/003; G06F 9/547
See application file for complete search history.

(56) References Cited

U.S. PATENT DOCUMENTS

| | | | |
|---|---|---|---|
| 8,881,223 B2 | 11/2014 | Hudis et al. | |
| 10,007,532 B1 | 6/2018 | Franco et al. | |
| 10,379,995 B1 * | 8/2019 | Walters | .................... G06N 7/00 |
| 10,607,011 B1 | 3/2020 | Orhan | |
| 10,803,169 B1 * | 10/2020 | Flatten | .................. G06F 21/554 |
| 10,873,601 B1 * | 12/2020 | Stickle | ................ H04L 63/1416 |

(Continued)

*Primary Examiner* — Muhammad Raza
(74) *Attorney, Agent, or Firm* — Harrity & Harrity, LLP

(57) ABSTRACT

In some implementations, a system may obtain a first model that is trained to identify feature data associated with a client system using one or more services of a service platform. The system may train, based on the feature data, a second model to identify anomalies associated with devices accessing the one or more services in association with a client identifier of the client system. The system may receive access data associated with an acting device accessing a service of the service platform. The system may determine, using the second model, that the acting device accessing the service corresponds to potential anomalous activity based on the access information. The system may obtain, from a verification device, a verification that the acting device accessing the service is anomalous activity. The system may perform, based on obtaining the verification, an action associated with the acting device.

20 Claims, 8 Drawing Sheets

(56) References Cited

U.S. PATENT DOCUMENTS

| | | |
|---|---|---|
| 2016/0154962 A1 | 6/2016 | Nunez di Croce |
| 2018/0025157 A1* | 1/2018 | Titonis et al. |
| 2018/0046475 A1* | 2/2018 | Wei .......................... G06N 3/08 |
| 2018/0183823 A1* | 6/2018 | Fadlil ........................ G06N 3/08 |
| 2019/0114417 A1* | 4/2019 | Subbarayan ........... G06N 20/00 |
| 2019/0236483 A1 | 8/2019 | Duer et al. |
| 2019/0253504 A1* | 8/2019 | Wang ...................... A63F 13/73 |
| 2020/0117523 A1 | 4/2020 | Morrison et al. |
| 2020/0396223 A1* | 12/2020 | Dube .................. H04L 63/0807 |

* cited by examiner

DETECTION OF ANOMALIES ASSOCIATED WITH FRAUDULENT ACCESS TO A SERVICE PLATFORM

BACKGROUND

A service platform may be positioned between a client system and a collection of backend services. The service platform may utilize an application programming interface (API) gateway as a proxy to accept API calls, aggregate various services required to fulfill API calls, and/or respond with results of operations performed in accordance with the services. Fraudulent access to an API gateway may impact numerous enterprises and/or consumers. With the advancement of technology, many sophisticated methods are being used to commit fraud, while fraud detection and/or fraud analysis has been employed to combat fraud. Methods of detecting and/or analyzing fraud may include one or more data analysis techniques.

SUMMARY

In some implementations, a system for detecting anomalous access to a service platform includes one or more memories; and one or more processors, communicatively coupled to the one or more memories, configured to: obtain service usage training data associated with one or more devices of a client system providing application programming interface (API) calls to one or more APIs associated with an API gateway; train, based on the service usage training data, a first model to identify feature data associated with the client system using the one or more APIs, wherein the feature data includes a service usage pattern of the client system and source data associated with the one or more devices; train, based on the feature data, a second model to identify anomalous API calls that include a client identifier of the client system; receive an API call associated with an acting device accessing an API of the API gateway, wherein the API call includes the client identifier; process the API call to identify access information associated with the acting device providing the API call; determine, based on the access information and using the second model, that the API call is a potential unauthorized API call; obtain, from a verification device, a verification that the API call is unauthorized; and perform, based on obtaining the verification, an action associated with the acting device.

In some implementations, a method for detecting anomalous access to a service platform includes obtaining a first model that is trained to identify feature data associated with a client system using one or more services of a service platform, wherein the feature data includes source data associated with one or more devices of the client system and a service usage pattern of one or more devices of the client system using the one or more services during a training period; training, based on the feature data, a second model to identify anomalies associated with devices accessing the one or more services in association with a client identifier of the client system; receiving access data associated with an acting device accessing a service of the service platform, wherein the access data includes the client identifier and access information associated with the acting device accessing the service; determining, using the second model, that the acting device accessing the service corresponds to potential anomalous activity based on the access information; obtaining, from a verification device, a verification that the acting device accessing the service is anomalous activity; and performing, based on obtaining the verification, an action associated with the acting device.

In some implementations, a non-transitory computer-readable medium storing a set of instructions includes one or more instructions that, when executed by one or more processors of a device, cause the device to: receive access data associated with an acting device accessing a service of a service platform, wherein the access data includes a client identifier of a client system and access information associated with the acting device accessing the service; determine, based on the access information and using a supervised machine learning model, a probability that the acting device accessing the service corresponds to anomalous activity, wherein the supervised machine learning model is trained based on: a service usage pattern associated with one or more devices of the client system accessing one or more services of the service platform, and source data of the one or more devices that identifies respective client addresses of the one or more devices or respective client locations of the one or more devices; determine that the probability satisfies a threshold probability indicating that the acting device accessing the service is likely an anomalous activity; request, via a user device and based on the probability satisfying the threshold probability, feedback that indicates whether the acting device accessing the service is anomalous activity; receive the feedback from the user device; and retrain the supervised machine learning model based on the feedback and the access data.

DETAILED DESCRIPTION

Figure 1A:
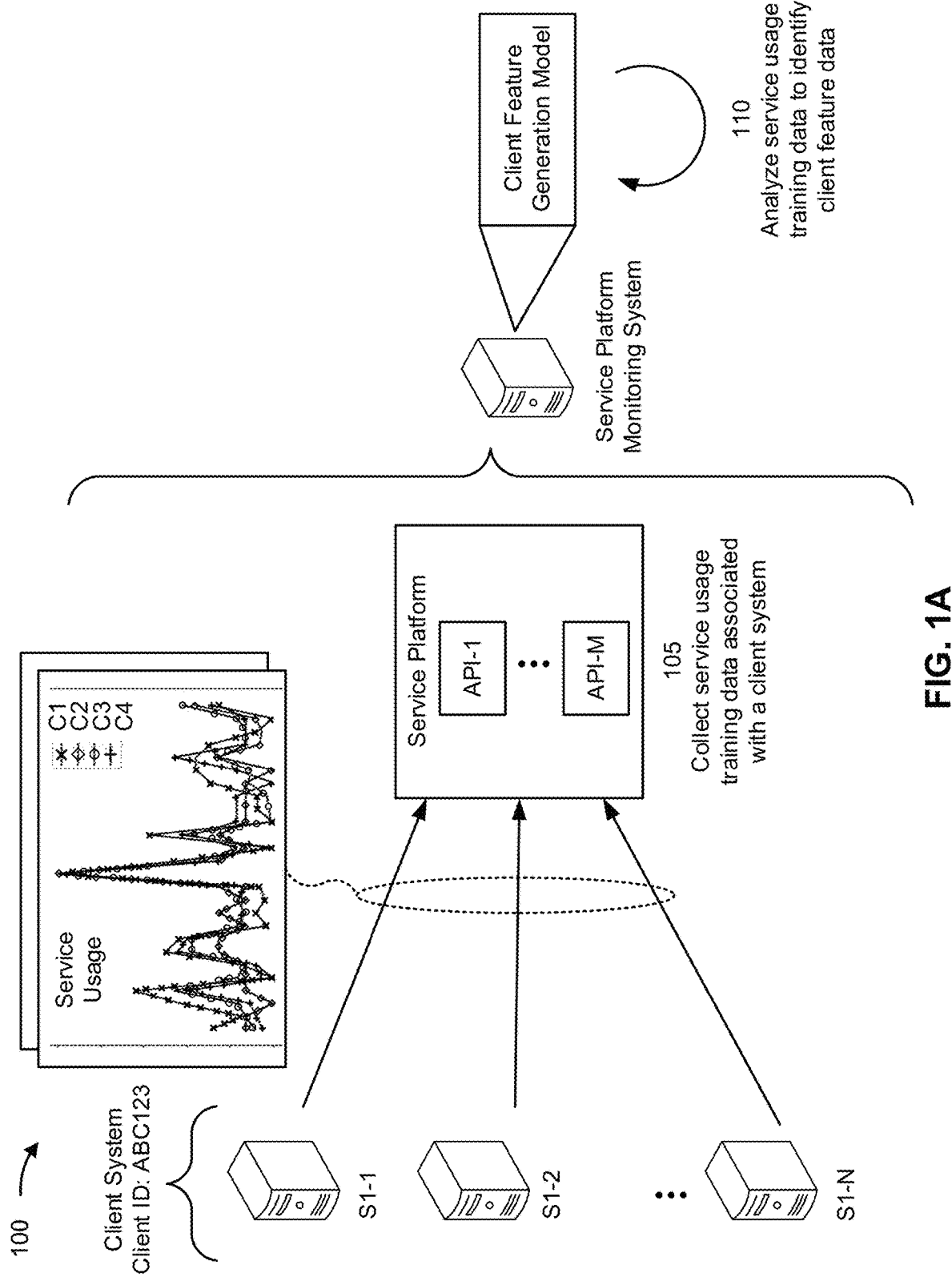
FIGS. 1A-1D are diagrams of an example implementation relating to detection of anomalies associated with fraudulent access to a service platform.

The following detailed description of example implementations refers to the accompanying drawings. The same reference numbers in different drawings may identify the same or similar elements.

Client systems may be configured to access a service platform to permit a client (e.g., an individual, an enterprise, an organization, or other type of entity) to access and/or receive services of the service platform. For example, a client system may be configured to access one or more application programming interfaces (APIs) associated with services provided by a service platform by providing a unique identifier (e.g., a name and/or account number) and/or credentials (e.g., a username and/or password) associated with the client (e.g., along with a request to access one or more services).

In some instances, a malicious actor may attack (e.g., by fraudulently gaining access to, utilizing, and/or altering) a client system and/or a service platform by posing as an authorized client. For example, a malicious actor that gained access to client-specific information of an authorized client system (e.g., via one or more hacking techniques) may use the client-specific information to fraudulently obtain and/or gather sensitive information associated with the client or the service platform, fraudulently alter settings or information associated with the client and/or the service platform, fraudulently access or receive services of the service platform, and/or fraudulently encrypt sensitive information associated with the client and/or the service platform. Such activity, when undetected, can negatively impact the client system and/or service platform and/or result in losses of computing resources (e.g., processing resources, memory resources, and/or power resources), sensitive information, and/or financial resources.

While certain anomaly detection techniques may be employed to detect these types of attacks, such techniques can be relatively inaccurate, thereby resulting in false positive determinations of fraud under certain circumstances. For example, when an authorized client uses a new device or system to access the service platform and/or accesses the service platform from a new location, some anomaly detection techniques may inaccurately prevent the access and/or flag the access as fraudulent (e.g., because the service platform does not recognize the device, the system, or the location as being associated with the client). In such cases, a service provider of the service platform may waste computing resources and/or network resources of the client system and/or the service platform to correct such inaccuracies or false positives. More specifically, client computing resources and/or network resources may be wasted by requiring generation and/or transmission of multiple requests (e.g., API calls) to access the service platform. Furthermore, service platform computing resources and/or network resources may be wasted by preventing authorized access and/or reactively updating the system (e.g., after the false positive access is detected) to accurately recognize that the device and/or the location are associated with the system.

Some implementations described herein provide a service platform monitoring system that is configured to accurately detect anomalies associated with fraudulent access to a service platform as compared to some other anomaly detection techniques. In some implementations, the service platform monitoring system may monitor access data associated with an acting device accessing a service of a platform and determine a probability that the acting device accessing the service corresponds to anomalous (or malicious) activity using a machine learning model. The machine learning model may be trained to detect anomalies based on service usage patterns of previous accesses by the client system. Additionally, or alternatively, the machine learning model may be trained based on source data associated with the previous accesses by the client system. The source data may identify client addresses of devices that performed the previous accesses and/or client locations (e.g., areas and/or regions) of the devices when performing the previous accesses. The machine learning model may be retrained based on feedback obtained in association with a detected anomaly (e.g., as a supervised machine learning model).

In this way, while the service platform monitoring system improves accuracy with respect to detecting anomalies associated with a service platform, the service platform monitoring system may dynamically identify and/or learn new authorized devices of a client system. Therefore, the service platform monitoring system, as described herein, may conserve any computing resources (e.g., processing resources, memory resources, and/or power resources) and/or network resources involved in correcting any fraudulent activity that would have been allowed without the use of the service platform monitoring system described herein. Furthermore, the service platform monitoring system may reduce the consumption of resources with respect to correcting inaccurate presumptions of fraudulent activity by dynamically identifying and/or recognizing new devices of a client system as authorized devices of the client system. Furthermore, the service platform monitoring system described herein can improve security with respect to accessing a service via a network (e.g., using an API call) by accurate categorization of access attempts as legitimate or fraudulent, and by reducing mis-categorization (e.g., false negatives and/or false positives).

FIGS. 1A-1D are diagrams of an example implementation 100 associated with detecting anomalies associated with fraudulent access to a service platform. As shown in FIGS. 1A-1D, example implementation 100 includes a client system that includes multiple client devices (shown as S1-1 through S1-N, where N>2), a service platform, a service platform monitoring system, a system user device, a client system management device, and a malicious activity database. As shown, the client system is identified by client identifier ABC123. The service platform may be an API gateway (and/or may include or be associated with an API gateway) that is used to provide one or more services using one or more APIs (shown as API-1 through API-M, where M>1). These devices are described in more detail below in connection with FIG. 3 and FIG. 4.

As shown in FIG. 1A, and by reference number 105, the service platform monitoring system may collect service usage training data associated with the client system. For example, the service platform monitoring system may obtain service usage training data during a training period associated with training a client feature generation model of the service platform monitoring system. The training period may correspond to an enrollment period and/or onboarding period associated with enrolling an account of the client system and/or a subscription to one or more of services provided by the service platform (e.g., via the APIs).

The training data may include information associated with one or more of the client devices submitting or providing API calls to one or more APIs associated with an API gateway (e.g., to receive a service associated with the one or more APIs). For example, for an application service platform, the one or more APIs may be associated with creating a module for the application, instantiating a virtual component for the module, and/or hosting the virtual component. As another example, for a financial service platform, the APIs may be associated with checking financial information associated with an account involved in a transaction associated with the client system (e.g., a customer's credit limit, a customer's account balance, and/or obtaining a credit score of the customer) authenticating a customer involved in the transaction, and/or processing the transaction. As a result, using the training data, the service platform monitoring system may enable the client system to access the service platform during the training period to learn one or more unique service usage patterns of the client system, as described elsewhere herein.

In example 100, a service usage graph represents values of collected service usage training data identified by C1, C2, C3, and C4. Service usage of the service usage training data may be graphed according to one or more sets of characteristics associated with service usage. For example, the service platform monitoring system may monitor and/or measure a frequency of access to a service by the client devices, according to timing (e.g., time of day, time of week, time of month, and/or time of year) of access to one or more of the APIs of the service platform, and/or according to certain types of services (e.g., as identified by service identifiers of the API calls and/or the APIs of the service platform) that are accessed by the client devices to receive the one or more services. Accordingly, the service platform monitoring system may monitor and/or measure the service usage according to the one or more characteristics.

As further shown in FIG. 1A, and by reference number 110, the service platform monitoring system may analyze the service usage training data, using the client feature generation model, to identify client feature data associated with the client system. The client feature data may include source information associated with the client system and/or service usage patterns of the client system. For example, the client feature generation model may process requests, identified in the service usage training data, associated with accessing the service platform (e.g., API calls associated with the APIs) to identify source data associated with the client devices. Additionally, or alternatively, the client feature generation model may process the requests to determine a service usage of the client system, as described elsewhere herein. The service platform monitoring system and/or client feature generation model may utilize any suitable processing techniques (e.g., data processing techniques, communication protocols, and/or natural language processing) to extract source information associated with the client system (e.g., from headers of packets associated with API calls) and/or to identify service usage of the client system (e.g., from identified APIs in headers of packets of API calls, from inputs and/or outputs included in payloads of packets associated with the API calls).

Figure 1B:
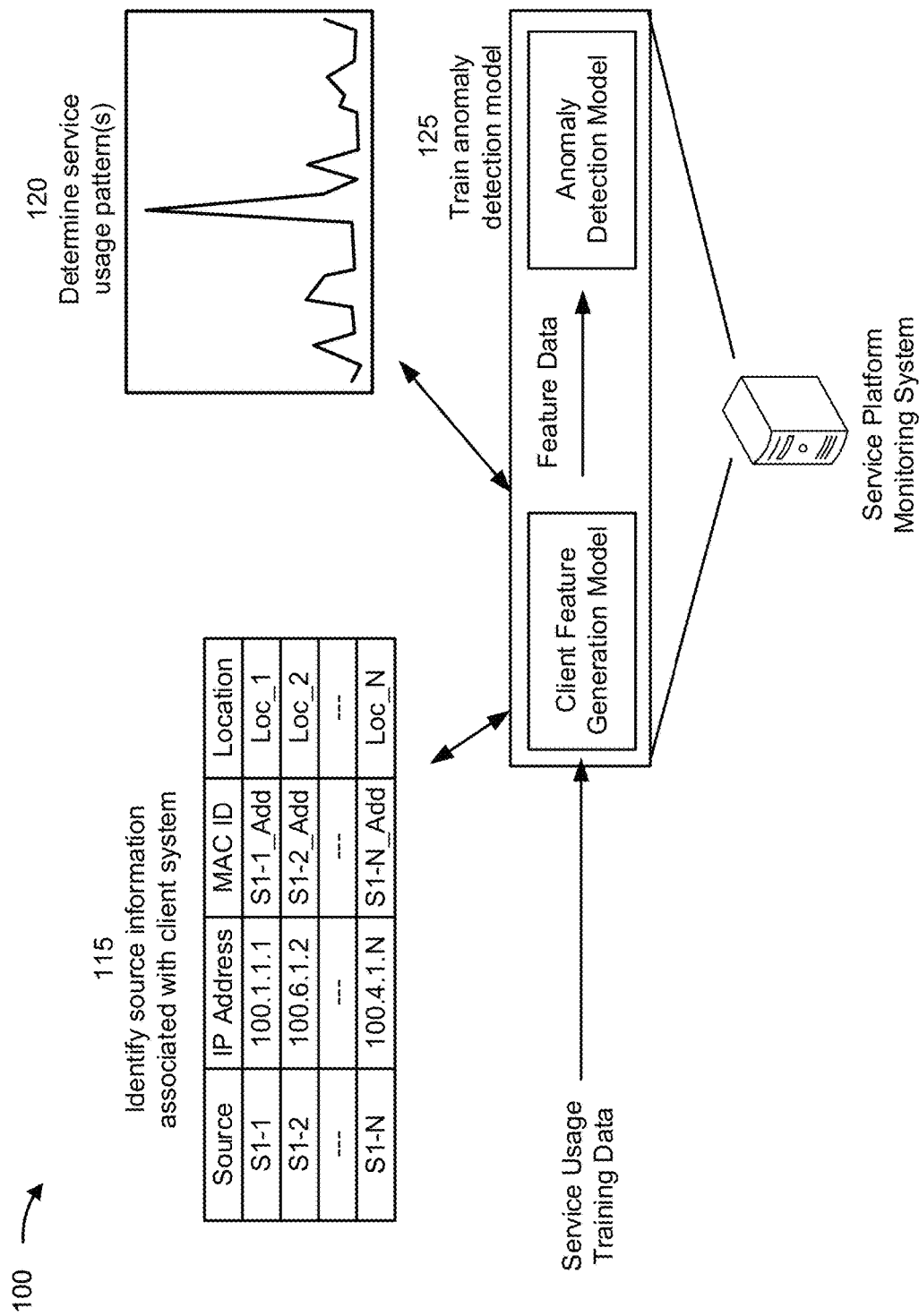

As shown in FIG. 1B, and by reference number 115, the service platform monitoring system may identify, using the client feature generation model, source information associated with the client system. For example, the source information may include corresponding source addresses of the client devices, client location information that identifies corresponding locations of the client devices, user information (e.g., a user identifier, a user credential, and/or user account information associated with the client system) associated with the client devices using the service platform.

To identify the source information associated with requests of the service usage training data, the client feature generation model may process the requests to identify and/or determine client addresses (e.g., Internet protocol (IP) addresses and/or medium access control (MAC) addresses, such as a source IP address and/or a source MAC address) of the client system and/or client location information associated with locations of the client system. For example, the client feature generation model may analyze a request by processing source information, network information (e.g., a network path between a client device that transmitted the request and the service platform) and/or destination information in the request (e.g., within a header of an API call). The client feature generation model may identify, extract, and/or maintain client addresses associated with the client system from the requests.

The client feature generation model may identify client location information associated with locations of the client devices from where the client devices accessed the service platform (e.g., locations from where the client devices transmitted the API calls). In some implementations, the location information includes geolocation information (e.g., geographical coordinates) and/or a location name (e.g., a name of a jurisdiction or region). In some implementations, the client feature generation model determines the location information based on the client address (e.g., using a mapping of geolocation information to IP addresses of a network associated with the client system) and/or an address of a network device of a network that is communicatively coupled to the client system and/or the service platform.

Accordingly, the service platform monitoring system may analyze the service usage training data to identify source information (and/or source data) associated with the client system and extract source information that includes client addresses and/or client locations of the client system. The service platform monitoring system may use the client addresses and/or client locations to detect and/or analyze anomalous activity involving requests that indicate that the request is associated with the client system (e.g., to detect malicious activity and/or to detect new authorized devices associated with the client system).

As further shown in FIG. 1B, and by reference number 120, the service platform monitoring system may determine, using the client feature generation model, one or more service usage patterns of the client system. For example, the service platform monitoring system may determine a service usage pattern of the client system according to time patterns associated with receiving corresponding API calls to the APIs of the service platform, according to determined frequencies of receiving corresponding API calls to the one or more APIs during a time period, and/or according to APIs that are identified in a single API call and/or a group of API calls from the client system (e.g., indicating that the APIs are associated with providing a same service of the service platform).

In some implementations, the client feature generation model uses a cosine similarity analysis to identify similarities within sets of the service usage training data. For example, the client feature generation model may identify similarities and/or clusters of similar service usage training data based on timestamps associated with the one or more client devices accessing the one or more services during a time period associated with training the supervised machine learning model and/or frequencies of accessing individual services of the one or more services during the time.

In some implementations, the client feature generation model may use and/or include a machine learning model (e.g., an unsupervised machine learning model) to automatically generate a profile of the client system based on the client feature data. For example, the service platform monitoring system may obtain the client feature generation model as a preconfigured and/or pretrained model that is associated with the service platform. Additionally, or alternatively, the service platform monitoring system may train the machine learning model based on one or more parameters associated with identifying or detecting service usage patterns of the client system, such as the frequencies of accessing a particular service during a particular time period, certain groups of APIs that are accessed during a particular time period, certain locations from which the client system access the APIs and/or send API calls to the service platform, and/or certain sets or groups of client devices (and/or users associated with the client devices) that access the service platform in association with the client system (e.g., using a client identifier of the client system).

The service platform monitoring system may train the machine learning model using historical data associated with identifying service usage patterns of one or more other client systems. The historical data may include historical values for the one or more parameters that were associated with the one or more other client systems accessing the service platform or another service platform (e.g., another service platform that provides a same or similar set of services as the service platform). Using the historical data and the one or more parameters as inputs to the machine learning model, the service platform monitoring system and/or the client feature generation model may identify feature data of the client system and/or generate a profile of the client system to detect anomalies associated with accessing the service platform and/or determine whether the anomalous activity is associated with malicious activity or an authorized access involving a new client device of the client system.

Accordingly, the service platform monitoring system may train, based on the service usage training data, the client feature generation model to identify feature data associated with and/or specific to the client system using the one or more APIs. In this way, the service platform monitoring system may use the trained client feature generation model to determine and/or learn feature data that includes a service usage pattern of the client system and/or source data associated with the client devices of the client system.

As further shown in FIG. 1B, and by reference number 125, the service platform monitoring system may train an anomaly detection model. For example, the service platform monitoring system may train the anomaly detection model based on the client feature data that is identified and/or learned by the trained client feature generation model. The service platform monitoring system may train the anomaly detection model to identify anomalous API calls that include a client identifier of the client system based on the determined source data and/or the determined service usage patterns of the client system. The anomaly detection model may be associated with a machine learning model (e.g., a neural network, a clustering model, and/or a prediction model). In some implementations, a machine learning model associated with the anomaly detection model includes a supervised machine learning model that is configured to learn to detect anomalies based on feedback from a verification device (e.g., the system user device), as described elsewhere herein.

Figure 1C:
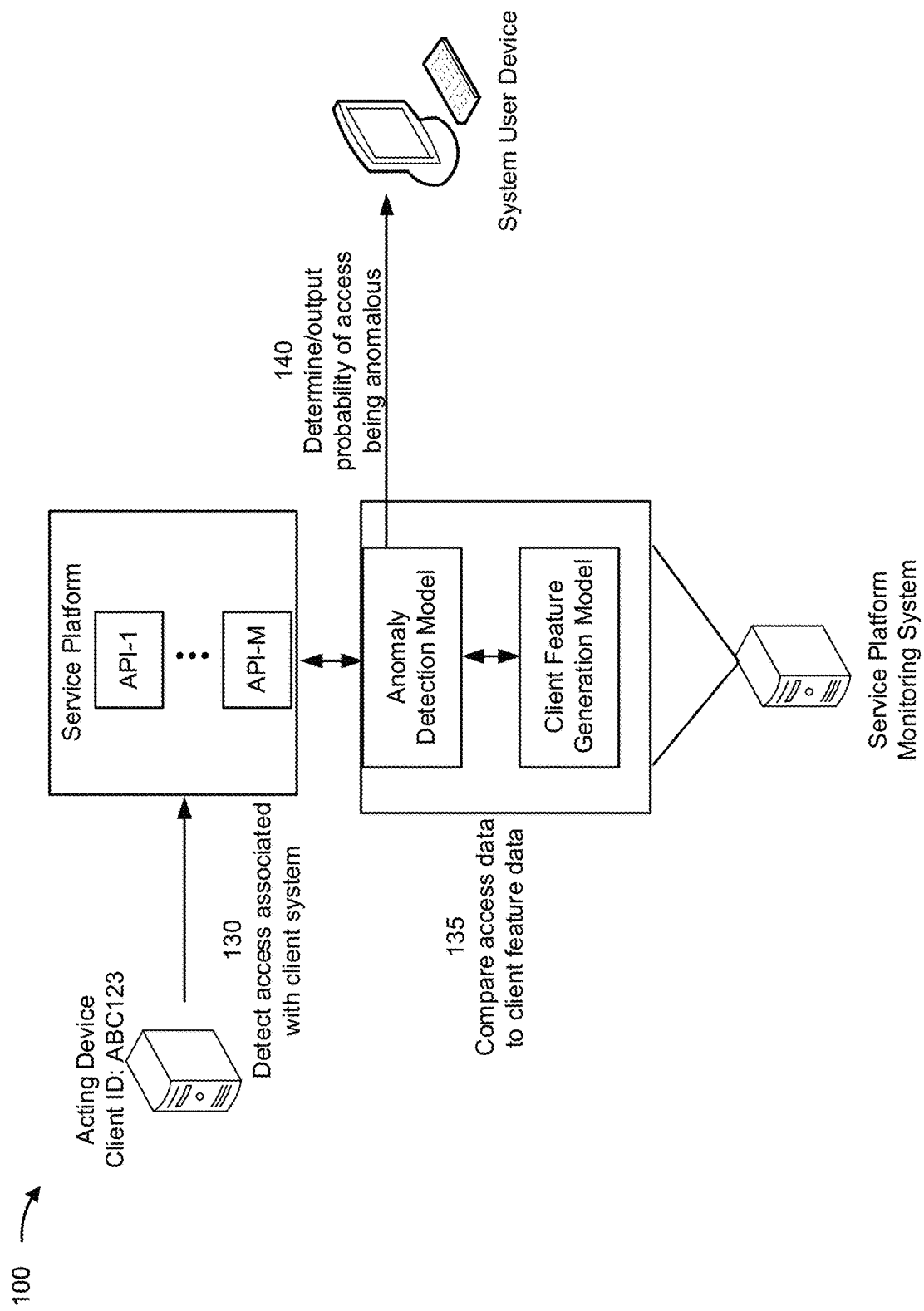

As shown in FIG. 1C, and by reference number 130, the service platform monitoring system may detect access associated with the client system by an acting device. The acting device may be a user device, a server device, or the like that is attempting to access the service platform (e.g., via an API call). For example, the acting device may indicate that the acting device is associated with the client system by including the client identifier (ABC123) within a request to the service platform (e.g., with an API call to an API of the service platform). The service platform monitoring system may receive an API call from the service platform. For example, the service platform may forward requests to the service platform monitoring system to cause the service platform monitoring system to perform an analysis to determine whether the request is associated with anomalous activity as described herein. In some implementations, the service platform monitoring system may be configured to intercept and/or preprocess requests or API calls from devices to detect anomalies associated with the requests and/or the API calls.

In some implementations, the service platform monitoring system may determine, based on the request, access data associated with the acting device sending the request and/or attempting to receive a service from the service platform. The access data may include the client identifier of the client system (ABC123) and/or access information associated with the acting device accessing the service platform. The access information may identify a service of the service platform (and/or an API of the service platform) and/or a timestamp associated with the request. Additionally, or alternatively, the access information may include source data associated with the acting device, such as information identifying a location of the acting device and/or a source address of the acting device.

As further shown in FIG. 1C, and by reference number 135, the service platform monitoring system, using the anomaly detection model, may compare the access data to client feature data associated with the client system. For example, based on the acting device indicating that the acting device is associated with the client system (e.g., via the client identifier), the anomaly detection model may compare source data and/or access information (e.g., information identifying the service, information indicating timing of the access, and/or information indicating a parameter of the service) with client feature data that was learned and/or provided by the client feature generation model. In some implementations, the service platform monitoring system may cause the anomaly detection model to determine whether the acting device is associated with the client system by causing the anomaly detection model to compare the access information and the client feature data (and/or specific sets of the access information with corresponding sets of the client feature data).

The anomaly detection model may use a similarity analysis (e.g., a cosine similarity analysis) to generate and/or analyze one or more comparisons between the access data associated with the acting device and a service usage pattern and/or to generate and/or analyze one or more comparisons between source information of the client system and source data associated with the acting device. More specifically, the anomaly detection model may analyze a comparison of client location information identified in the source data and device location information (e.g., identified or included in the access information), that identifies a location of the acting device (e.g., to determine whether the location is within a known area or location of the client system). Additionally, or alternatively, the anomaly detection model may analyze a comparison of a client address identified in the source data and a device address of the acting device that is identified in the access information (e.g., to determine whether the acting device is a known device of the client system). In some implementations, the anomaly detection model may analyze a comparison of timing of accessing one or more services identified in the service usage pattern and timing of the acting device accessing the service identified in the access information.

As further shown in FIG. 1C, and by reference number 140, the service platform monitoring system, using the anomaly detection model, may determine and/or output a probability of the access being anomalous. For example, the service platform monitoring system may determine the probability of the access being anomalous based on comparing the access data to the client feature data (e.g., based on comparing characteristics of the access information with corresponding characteristics of the client feature data). Additionally, or alternatively, the service platform monitoring system may output (e.g., transmit) the probability to the system user device in association with a request for a user input that indicates whether the acting device is authorized to access the API and/or whether the access is anomalous (e.g., whether malicious by a hacker or non-malicious by an authorized new client device of the client system). The probability may correspond to an indication of whether the acting device is authorized or is not authorized by client system to access the service platform and/or a particular API of the service platform and/or whether an API call of the access is authorized or not authorized from the acting device. For example, a high probability of the access being associated with anomalous activity may indicate a higher likelihood that the acting device is not authorized to access the client system and/or that the API call was not authorized from the acting device.

The anomaly detection model may be configured to detect anomalies associated with accesses to the service platform using an identifier of the client system using a decision tree or other type of hierarchical analysis. For example, use of a decision tree may involve detecting an anomaly by processing information in a particular order. As a specific example, the anomaly detection model may detect an anomaly based on first analyzing timing of a request (e.g., relative to the service usage pattern), then analyzing a source address of the request, and then analyzing a source location of the request. In such an example, based on whether the timing indicates that the request is made outside of a usage threshold of the service usage pattern, the anomaly detection model may determine whether the access is indicative of anomalous activity or a particular type of anomalous activity. The usage threshold may correspond to a time period associated with the client system accessing the service according to the service usage pattern and/or a frequency range of the client system accessing the service. If outside of the usage threshold (which is indicative of an anomaly, such as a malicious attack), the anomaly detection model may analyze the source address to determine whether the source address is a known address of the client system (e.g., a learned IP address and/or MAC address of the client system maintained by the client feature generation model and/or anomaly detection model). If the source address does not match a client address of the client system (which is indicative of an anomaly, such as a malicious attack or a new client device being added to the client system), the anomaly detection model may then analyze the source location of the request to determine whether the request was made from a known location (or area) of the client system (e.g., a learned client location or client region of the client system maintained by the client feature generation model and/or the anomaly detection model). If the source location is outside of a threshold distance of a known client location, the service platform monitoring system may determine that the access is indicative of a malicious attack. If the source location is within a threshold distance of a known client location, the service platform monitoring system may determine that the access is indicative of a new client device of the client system performing an authorized access to the service platform.

Accordingly, the anomaly detection model may detect anomalies (and/or a probability of anomalies) based on whether timing of the device accessing the service is outside of a usage threshold of the service usage pattern, based on whether a source address of the acting device in the access information matches a client address of the respective client addresses, and/or based on whether a source location of the acting device is within a distance threshold of a client location of the respective client locations. Other example sequences of the above decision tree are possible.

In some implementations, the probability may correspond to a type of anomalous activity. For example, the anomaly detection model may be trained to determine a probability of the access being associated with a malicious attack (e.g., in association with preventing malicious attacks) and/or a probability of the access being associated with a new or unknown client device of the client system performing an authorized access to the service platform and/or an API of the service platform (e.g., in association with learning or detecting new client devices of the client system). In such a case, the anomaly detection model may provide the probabilities that the access is associated with various types of anomalies (e.g., to obtain feedback that verifies whether the access is specifically associated with a particular type of anomaly).

Figure 1D:
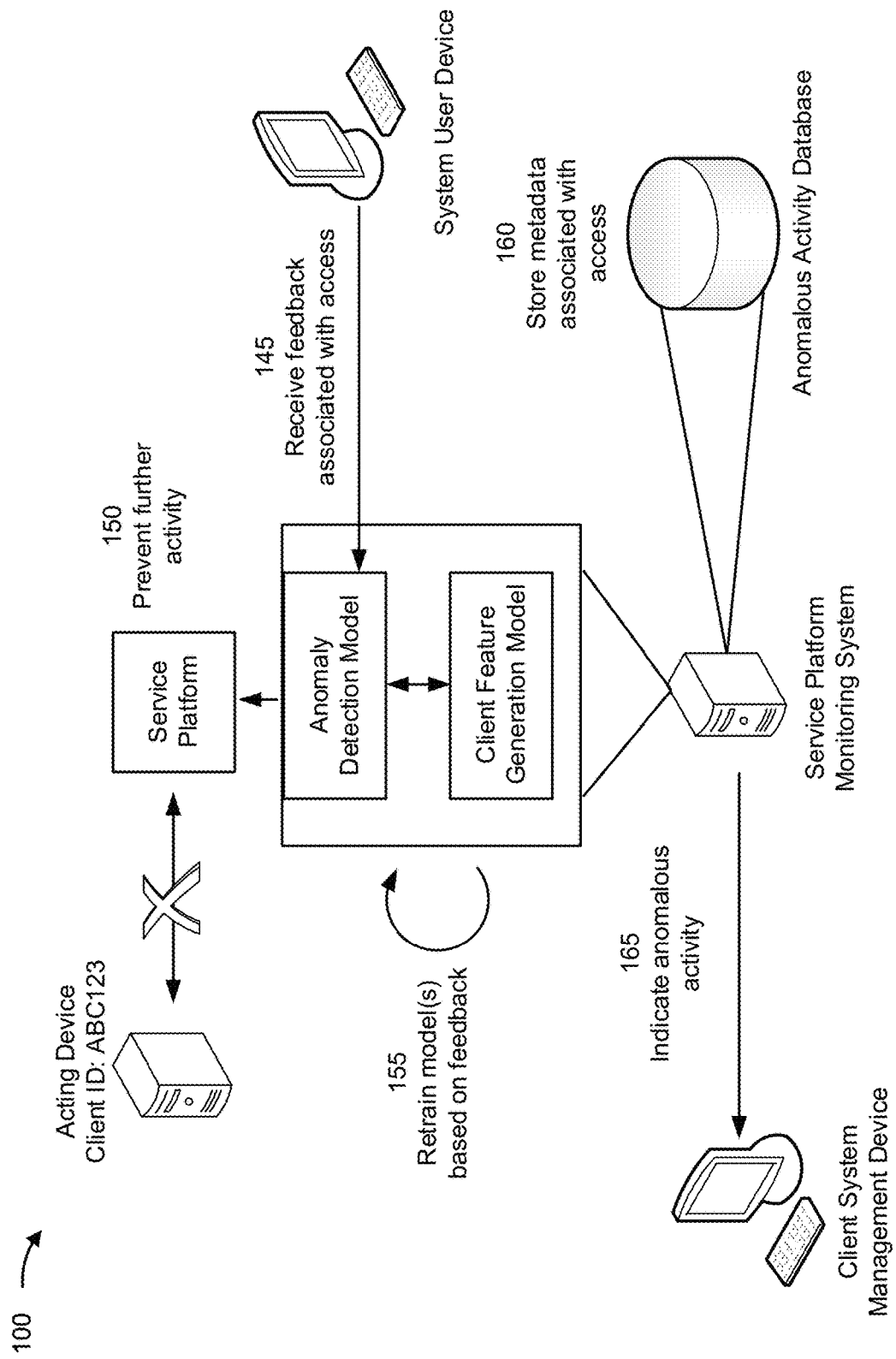

As shown in FIG. 1D, and by reference number 145, the service platform monitoring system may receive feedback associated with the access by the acting device. For example, the system user device may be associated with a verification device that is configured to verify whether the acting device accessing the service platform corresponds to anomalous activity. The feedback may include a verification (e.g., based on a user input from a user of the system user device) that the access is (or is indicative of) anomalous activity or non-anomalous activity and/or that an API call was authorized or unauthorized.

As further shown in FIG. 1D, and by reference number 150, the service platform monitoring system may prevent the service platform from engaging in further activity with the acting device. For example, based on the probability of the access being associated with anomalous activity and/or based on the feedback from the system user device, the anomaly detection model may block the API call (and/or future API calls) from the acting device and/or prevent the API call from reaching the service platform and/or a corresponding API of the service platform (e.g., to prevent a malicious attack via the API call and/or subsequent API calls from the acting device). In such cases, the service platform monitoring system may drop the API call and/or any subsequent API calls received from the acting device.

In some implementations, if the anomaly detection model determines (e.g., based on the probability of the access being anomalous and/or based on the feedback) that the access or API call is not anomalous, the anomaly detection model may permit the access to the service platform (e.g., by enabling the API call of the access to reach the intended API and/or the API gateway of the service platform). In such a case, the anomaly detection model may determine that the acting device is authorized to access the service platform (e.g., as a known client device of the client system). Additionally, or alternatively, based on a probability of the type of anomalous activity indicates that the acting device is likely a new or unknown, but authorized, client device of the client system, the service platform monitoring system may permit the acting device to access the service platform.

As further shown in FIG. 1D, and by reference number 155, the service platform monitoring system may retrain the anomaly detection model and/or the client feature generation model based on the feedback. For example, the service platform monitoring system may retrain the anomaly detection model based on the access data, an API call associated with the access data, and/or the feedback received from the system user device to improve an accuracy of the anomaly detection model and/or to dynamically permit the anomaly detection model to learn one or more indicators of anomalous or non-anomalous activity associated with devices using the client identifier of the client system.

As described herein, the anomaly detection model may be a supervised machine learning model and/or may include a supervised machine learning model that is configured to learn to detect anomalies based on feedback from a verification device (e.g., the system user device). For example, the anomaly detection model may be trained (e.g., initially), based on the client feature data, to make a prediction (e.g., a probability) of whether a device accessing the service platform using a client identifier of the client system is anomalous and/or a type of anomalous activity (e.g., whether malicious activity or involving a new or unknown client device of the client system). The service platform monitoring system may provide the prediction to the verification device to prompt a user of the verification device to provide feedback (e.g., via a user input) that verifies an accuracy of the prediction (e.g., verifies whether the prediction of the anomalous activity or the type of anomalous activity is accurate). Based on received feedback from the user and/or the verification device, the service platform monitoring system may further train (and/or retrain) the anomaly detection model to improve the accuracy of the anomaly detection model, as described elsewhere herein.

The service platform monitoring system may further train the anomaly detection model during an evaluation period following a training period (e.g., a time period during which the service usage training data was collected) of the client feature generation model and/or the anomaly detection model. In this way, the service platform monitoring system may dynamically train the anomaly detection model based on the client feature data to detect anomalies involving the client devices or other devices (e.g., malicious devices) accessing the one or more services by using a client identifier of the client system.

As further shown in FIG. 1D, and by reference number 160, the service platform monitoring system may store metadata associated with the access by the acting device. For example, the service platform monitoring system may store the access data and/or an indication of whether the access was determined to be anomalous within an anomalous activity database that is maintained to for use by one or more machine learning models of the client feature generation model and/or the anomaly detection model. The anomalous activity database may be any suitable data structure (e.g., a table, a list, an index, a graph, or the like) and may be maintained to track information associated with identified anomalous activity. Accordingly, the anomalous activity database may store historical data associated with anomalous (and/or non-anomalous) activity, such as timing of submitting anomalous requests (or API calls), location information that identifies locations associated with anomalous requests, device identifiers associated with devices that submitted anomalous requests (e.g., to maintain a database of devices used to perform a malicious attack and/or to maintain a database of devices that were identified as new or learned client devices associated with the client system), and/or service and/or API information associated with anomalous requests (e.g., to identify services and/or APIs that are targeted in malicious attacks).

As further shown in FIG. 1D, and by reference number 165, the service platform monitoring system may indicate anomalous activity to a client system management device. The service platform monitoring system may indicate the anomalous activity based on the probability and/or the feedback indicating that the acting device was not authorized to access the service platform in association with the client system (e.g., not authorized to use the client identifier). For example, the service platform monitoring system may transmit, to a management device (e.g., the system user device and/or the client system management device of the client system), a notification that indicates that the acting device provided an anomalous API call and/or that access by the acting device was indicative of anomalous activity. Accordingly, via the notification, the service platform monitoring system may notify a manager or representative of the client system and/or a service provider associated with the service platform of the anomalous activity and/or that the acting device engaged in anomalous activity.

In this way, as described herein, the service platform monitoring system may accurately detect anomalous activity to prevent malicious attacks and/or dynamically learn type of anomalous activity that are non-malicious and/or authorized by a client system (e.g., to prevent false positive indications of malicious attacks by authorized client devices of the client system). Accordingly, the service platform monitoring system may conserve computing resources and/or network resources that would otherwise be wasted without using a service platform monitoring system, as described herein, to accurately detect various types of malicious activity. Furthermore, similar resources may be conserved that would otherwise be wasted without a service platform monitoring system, configured as described herein, to perform corresponding actions, based on the type of anomalous activity, prevent devices associated with malicious activity from accessing the service platform or permitting previously unknown devices that are authorized to access the service platform to access the service platform.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
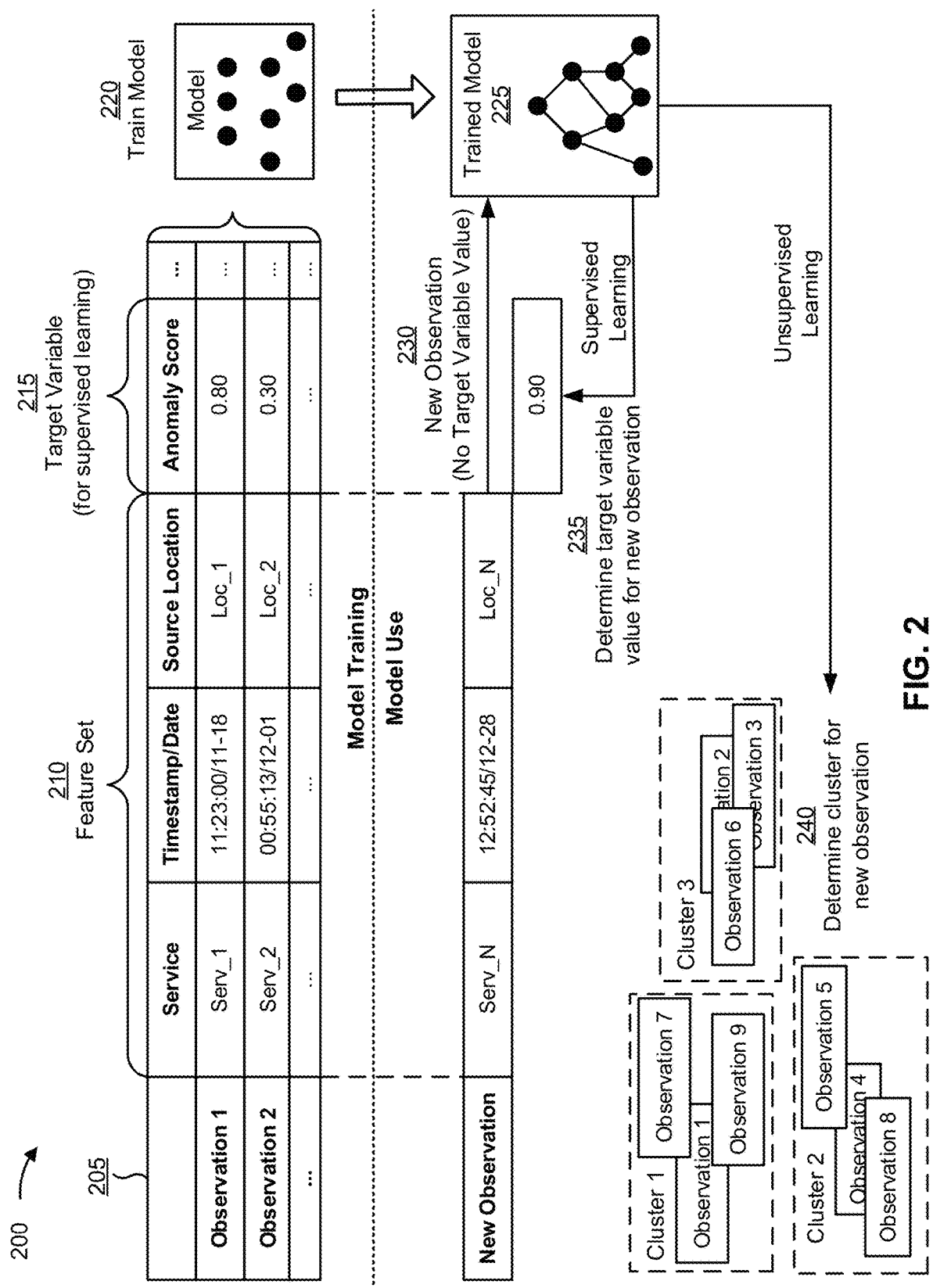
FIG. 2 is a diagram illustrating an example of training and using a machine learning model described herein.

FIG. 2 is a diagram illustrating an example 200 of training and using a machine learning model in connection with detection of anomalies associated with fraudulent access to a service platform. The machine learning model training and usage described herein may be performed using a machine learning system. The machine learning system may include or may be included in a computing device, a server, a cloud computing environment, or the like, such as the service platform monitoring system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a client system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the client system (e.g., S1-1 to S1-N). For example, the machine learning system may identify a feature set (e.g., one or more features and/or feature values) by extracting the feature set from structured data and/or by receiving input from an operator.

As an example, a feature set for a set of observations may include a first feature of a service (e.g., identified by a service identifier), a second feature of a timestamp/date, a third feature of a source location, and so on. As shown, for a first observation, the first feature may have a value of Serv_1 (e.g., as an identifier of a server of the client system that accessed a service), the second feature may have a value of 11:23:00/11-18 (corresponding to a time and date of the first observation), the third feature may have a value of Loc_1 (e.g., corresponding to a location and/or an IP address associated with a location of the access), and so on. These features and feature values are provided as examples, and may differ in other examples. For example, the feature set may include one or more of the following features: an IP address (e.g., a source IP address), a client device identifier (e.g., an international mobile equipment identifier (IMEI) and/or a MAC address, such as a source MAC address), one or more user credentials associated with an authorized user of the client system, a parameter of a service request (described elsewhere herein), an API identifier, a type of an API call, a type of output requested from the service platform, and/or any other suitable variable involving access to a service platform described elsewhere herein.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an anomaly score, which has a value of 0.80 for the first observation. The anomaly score may indicate or represent a probability (e.g., 80% in example 200) that the corresponding observation is associated with anomalous activity involving the client system.

The feature set and target variable described above are provided as examples, and other examples may differ from what is described above. For example, for a target variable that includes a relatively high probability of being an anomaly (e.g., a probability that is greater than a threshold percentage), the feature set may include one or more values that indicate that a device that is accessing the service platform using an identifier of the client system is likely a malicious device and/or that the device is likely unauthorized to access or utilize the service platform using the identifier of the client system.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised machine learning model.

In some implementations, the machine learning model may be trained on a set of observations that do not include a target variable. This may be referred to as an unsupervised machine learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of Serv_N (e.g., an identifier identified by a device associated with the new observation), a second feature of 12:52:45/12-28 (e.g., a time and date at which the device accessed the service platform, a third feature of Loc_N (e.g., a location from which the device access the service platform), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 0.90 for the target variable of the anomaly score for the new observation (e.g., indicative of a 90% probability of an anomaly), as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to perform an action based on whether activity of the new observation involves anomalous activity, a recommendation to investigate the access by the device, and/or a recommendation to prevent any further action by the device. The first automated action may include, for example, preventing any further action by the device (e.g., until the device is investigated to determine whether the device is associated with the anomalous activity), storing data and/or values associated with the feature set of the new observation, providing a notification that the new observation likely includes anomalous activity, or the like.

As another example, if the machine learning system were to predict a value of 0.10 (e.g., indicative of a 10% probability of an anomaly, which may be lower than a threshold probability of being associated with anomalous activity) for the target variable of the anomaly score, then the machine learning system may provide a second (e.g., different) recommendation (e.g., permit the access by a device associated with the new observation) and/or may perform or cause performance of a second (e.g., different) automated action (e.g., enable access to the service platform, recognize the device of the new observation as being associated with client system, and/or indicate that the device of the new observation is associated with the client system).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., likely associated with an authorized device of the client system), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., likely not associated with an authorized device of the client system), then the machine learning system may provide a second (e.g., different) recommendation (e.g., a recommendation to perform an investigation of the device, a recommendation to perform an action to prevent the device from further access to the service platform, and/or a recommendation send a notification of anomalous activity to the client system) and/or may perform or cause performance of a second (e.g., different) automated action, such as investigate the device, prevent the device from further accessing the service platform, and/or send a notification of anomalous activity to the client system, store a record of anomalous activity involving the device).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect anomalous activity associated with a client system and/or identify that unknown devices are associated with the client system. The machine learning system enables recognition and/or identification of tens, hundreds, thousands, or millions of features and/or feature values for tens, hundreds, thousands, or millions of observations, thereby increasing accuracy and consistency and reducing delay associated with detecting anomalies and/or identifying authorized devices of a client system relative to requiring computing resources to be allocated for tens, hundreds, or thousands of operators to manually detect anomalies and/or identify authorized devices of a client system using the features or feature values.

As indicated above, FIG. 2 is provided as an example. Other examples may differ from what is described in connection with FIG. 2.

Figure 3:
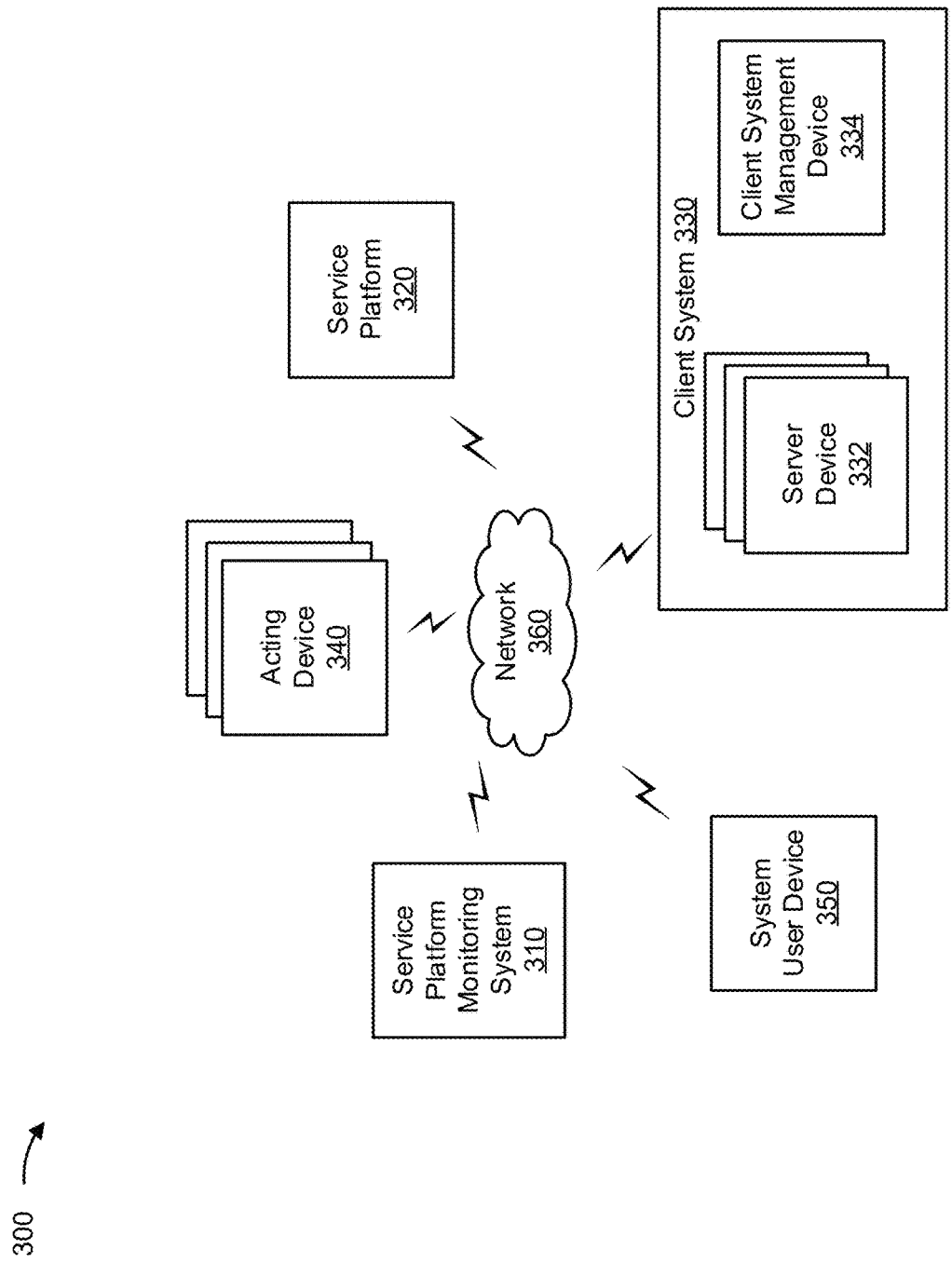
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a service platform monitoring system 310, a service platform 320, and a client system 330 that includes one or more server devices 332 and a client system management device 334. Further, example environment 300 includes one or more malicious devices 340, a system user device 350, and a network 360. Devices of environment 300 may interconnect via wired connections, wireless connections, or a combination of wired and wireless connections.

The service platform monitoring system 310 includes one or more devices capable of receiving, generating, storing, processing, providing, and/or routing information associated with monitoring a service platform and/or detecting anomalies associated with accessing the service platform 320, as described elsewhere herein. The service platform monitoring system 310 may include a communication device and/or a computing device. In some implementations, the service platform monitoring system 310 includes a server and/or computing hardware used in a cloud computing environment.

The service platform 320 includes one or more devices capable of receiving, generating, storing, processing, providing, and/or routing information associated with providing a service and/or hosting APIs, as described elsewhere herein. The service platform 320 may include a communication device and/or a computing device. For example, the service platform 320 may include a server, such as an application server, an API gateway (e.g., a backend device that hosts one or APIs of the service platform 320), a web server, a database server, a host server, a virtual server (e.g., executing on computing hardware), or a server in a cloud computing system.

The client system 330 includes one or more devices capable of receiving, generating, storing, processing, providing, and/or routing information associated with a client that is authorized to access and/or utilize a service of the service platform 320, as described elsewhere herein. For example, the client system 330 may access and/or utilize the services via the server devices 332 and manage the access and/or utilization of the services of the service platform 320 via the client system management device 334, as described elsewhere herein.

The server device 332 includes one or more devices capable of receiving, generating, storing, processing, providing, and/or routing information associated with accessing or utilizing services of the service platform 320, as described elsewhere herein. The server device 332 may include a communication device and/or a computing device. For example, the server device 332 may include a server, such as an application server, a client server, a web server, a database server, a host server, a proxy server, a virtual server (e.g., executing on computing hardware), or a server in a cloud computing system. In some implementations, the server device 332 includes computing hardware used in a cloud computing environment.

The client device 334 includes one or more devices capable of receiving, generating, storing, processing, and/or providing information associated with managing the server devices 332, as described elsewhere herein. The client device 334 may include a communication device and/or a computing device. For example, the client device 334 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The acting device 340 includes one or more devices capable of receiving, generating, storing, processing, and/or providing information associated with maliciously accessing and/or attacking the service platform 320. For example, the acting device 340 may be configured to access the service platform 320 utilizing a client identifier that permits the service platform monitoring system 310 to detect anomalous activity or malicious activity that can be detected by the service platform monitoring system, as described elsewhere herein. The acting device 340 may correspond to a malicious device or a new server device or unknown server device of the client system 330.

The system user device 350 includes one or more devices capable of receiving, generating, storing, processing, and/or providing information associated with managing the service platform monitoring system 310, as described elsewhere herein. The system user device 350 may include a communication device and/or a computing device. For example, the user device 350 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 360 includes one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
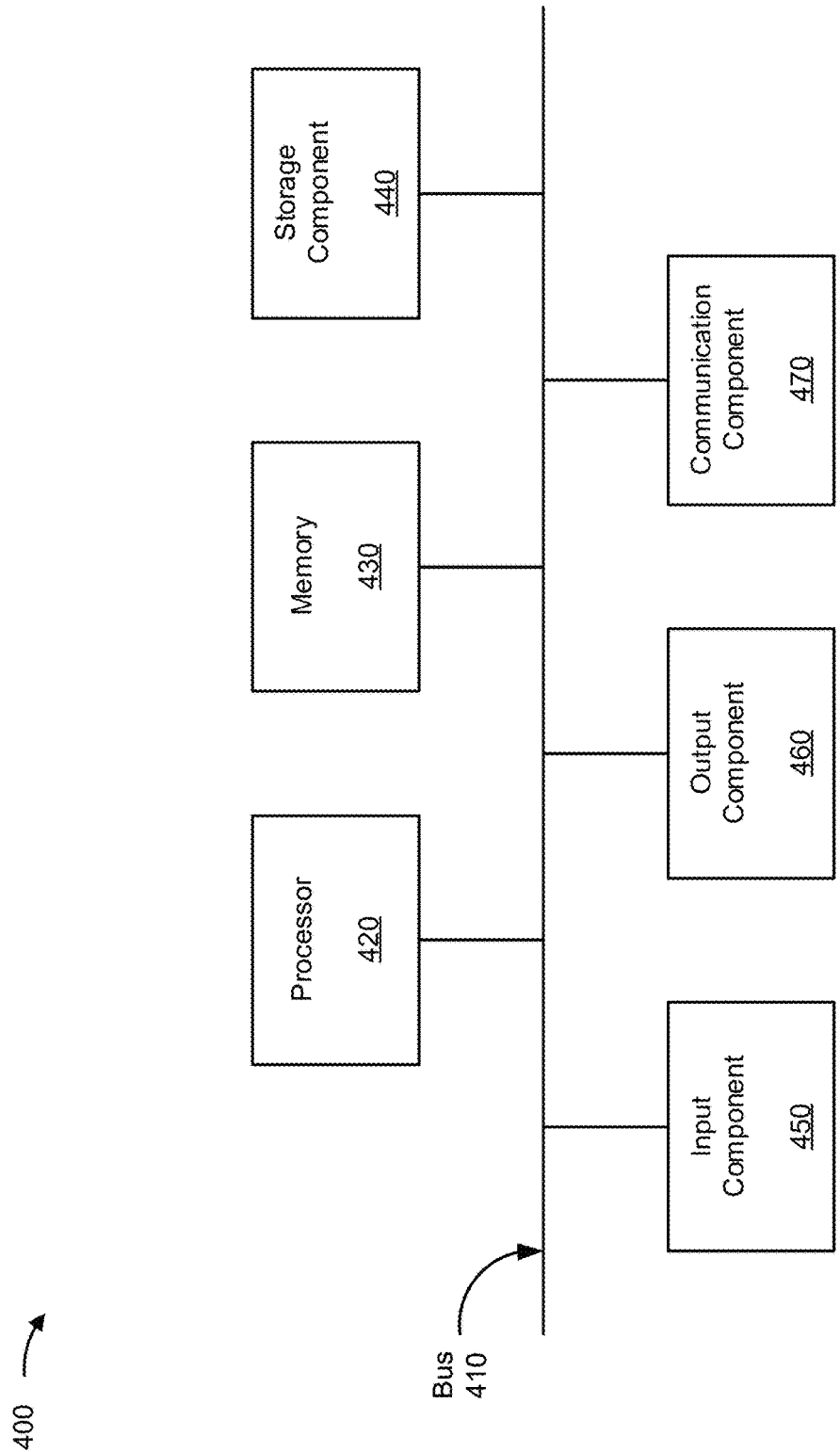
FIG. 4 is a diagram of example components of one or more devices of FIG. 3.

FIG. 4 is a diagram of example components of a device 400, which may correspond to service platform monitoring system 310, the service platform 320, the client system 330, the server device 332, the client system management device 334, the acting device 340, and/or the system user device 350. In some implementations, service platform monitoring system 310, the service platform 320, the server device 332, the client system management device 334, the acting device 340, and/or the system user device 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
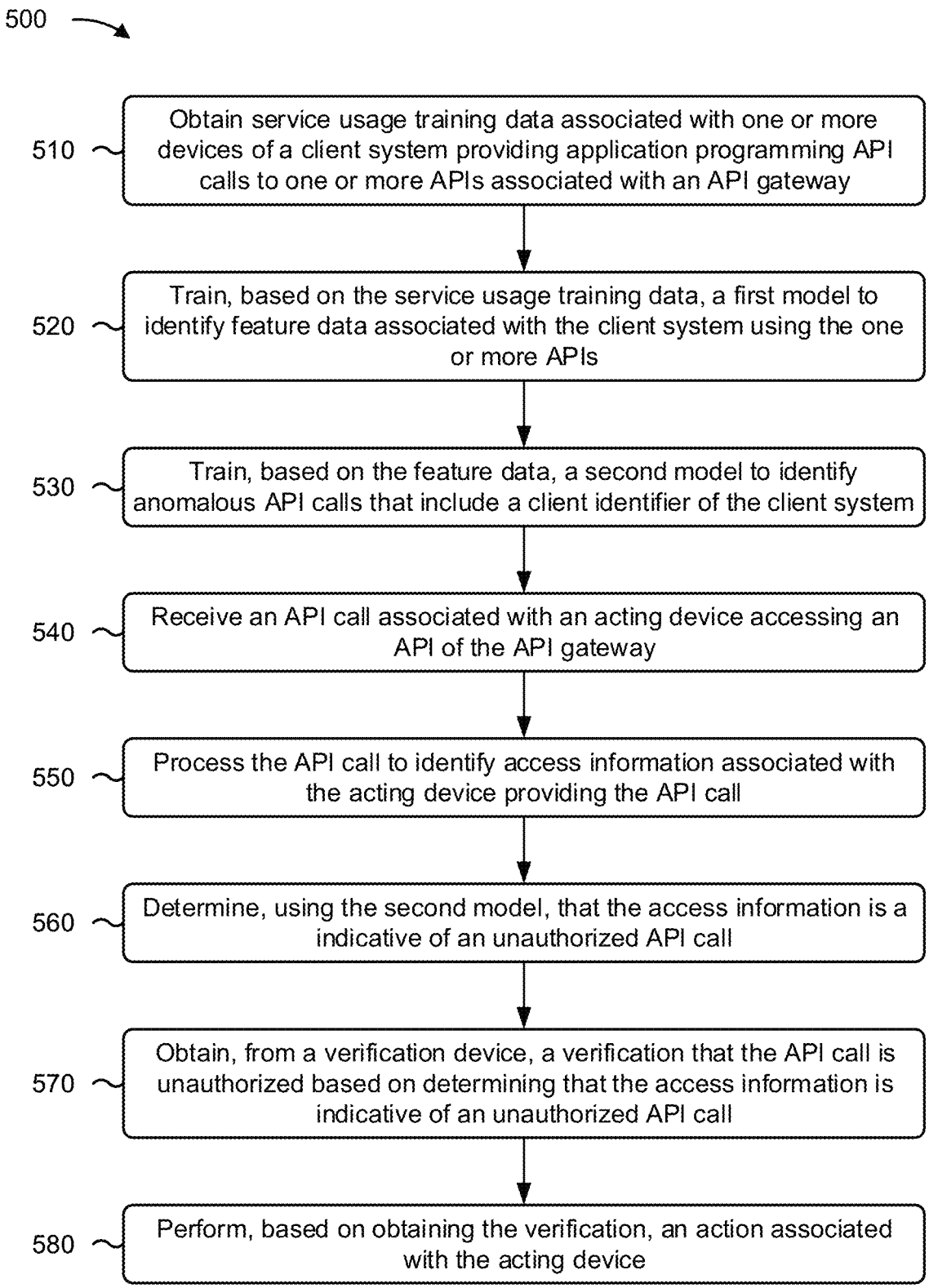
FIG. 5 is a flowchart of an example process relating to detection of anomalies associated with fraudulent access to a service platform.

FIG. 5 is a flowchart of an example process 500 associated with detecting of anomalies associated with fraudulent access to. In some implementations, one or more process blocks of FIG. 5 may be performed by a service platform management system (e.g., service platform management system 310). In some implementations, one or more process blocks of FIG. 5 may be performed by another device or a group of devices separate from or including the service platform management system, such as service platform 320 and/or client system 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining service usage training data associated with one or more devices of a client system providing application programming interface (API) calls to one or more APIs associated with an API gateway (block 510). As further shown in FIG. 5, process 500 may include training, based on the service usage training data, a first model to identify feature data associated with the client system using the one or more APIs (block 520). In some implementations, the feature data includes a service usage pattern of the client system and source data associated with the one or more devices.

As further shown in FIG. 5, process 500 may include training, based on the feature data, a second model to identify anomalous API calls that include a client identifier of the client system (block 530). As further shown in FIG. 5, process 500 may include receiving an API call associated with an acting device accessing an API of the API gateway (block 540). In some implementations, the API call includes the client identifier.

As further shown in FIG. 5, process 500 may include processing the API call to identify access information associated with the acting device providing the API call (block 550). As further shown in FIG. 5, process 500 may include determining, based on the access information and using the second model, that the API call is a potential unauthorized API call (block 560).

As further shown in FIG. 5, process 500 may include obtaining, from a verification device, a verification that the API call is unauthorized (block 570). As further shown in FIG. 5, process 500 may include performing, based on obtaining the verification, an action associated with the acting device (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting anomalous access to a service platform, the system comprising:
   one or more memories; and
   one or more processors, communicatively coupled to the one or more memories, configured to:
      obtain service usage training data associated with one or more devices of a client system providing application programming interface (API) calls to one or more APIs associated with an API gateway;
      train, based on the service usage training data, a first model to identify feature data associated with the client system using the one or more APIs, wherein the feature data includes a service usage pattern of the client system and source data associated with the one or more devices,
         wherein the first model comprises an unsupervised machine learning model that is trained according to a cosine similarity analysis;
      train, based on the feature data, a second model to identify anomalous API calls that include a client identifier of the client system,
         wherein the second model comprises a supervised machine learning model that is trained according to a decision tree associated with the feature data;
      receive an API call associated with an acting device accessing an API of the API gateway, wherein the API call includes the client identifier;
      process the API call to identify access information associated with the acting device providing the API call;
      determine, based on the access information and using the second model, that the API call is a potential unauthorized API call;
      obtain, from a verification device, a verification that the API call is unauthorized; and
      perform, based on obtaining the verification, an action associated with the acting device.

2. The system of claim 1, wherein the service usage pattern identifies at least one of:
   time patterns associated with receiving corresponding API calls to the one or more APIs; or frequencies of receiving corresponding API calls to the one or more APIs during a time period.

3. The system of claim 1, wherein the source data identifies at least one of:
 corresponding source addresses of the one or more devices;
 client location information that identifies corresponding locations of the one or more devices; or
 corresponding user information associated with the one or more devices using the one or more APIs.

4. The system of claim 1, wherein the one or more processors, when determining that the API call is a potential unauthorized API call, are configured to:
 cause the second model, based on the access information, to determine whether the acting device is associated with the client system based on at least one of:
  a comparison of client location information identified in the source data and device location information, of the access information, that identifies a location of the acting device; or
  a comparison of client addresses identified in the source data and a device address of the acting device that is identified in the access information.

5. The system of claim 1, wherein the one or more processors, when determining that the API call is a potential unauthorized API call, are configured to:
 compare the access information and the feature data;
 determine, based on comparing characteristics of the access information with corresponding characteristics of the feature data, a probability that the acting device is not authorized by the client system to access the API;
 determine that the probability satisfies a threshold probability associated with unauthorized access of the API in association with the client identifier; and
 determine, based on the probability satisfying the threshold probability, that the acting device accessing the API corresponds to potential anomalous activity.

6. The system of claim 1, wherein the one or more processors, when obtaining the verification, are configured to:
 send, to the verification device, a request for a user input that indicates whether the acting device is authorized to access the API; and
 receive the user input from the verification device, wherein the verification is included within the user input.

7. The system of claim 1, wherein the one or more processors, when performing the action, are configured to at least one of:
 prevent the acting device from further accessing the API gateway;
 transmit, to a management device, a notification that indicates that the acting device provided an anomalous API call;
 storing, in a data structure, the API call in association with an indication that the acting device provided an anomalous API call; or
 retrain the second model based on the API call.

8. A non-transitory computer-readable medium storing a set of instructions, the set of instructions comprising:
 one or more instructions that, when executed by one or more processors of a system, cause the system to:
  obtain service usage training data associated with one or more devices of a client system providing application programming interface (API) calls to one or more APIs associated with an API gateway;
  train, based on the service usage training data, a first model to identify feature data associated with the client system using the one or more APIs, wherein the feature data includes a service usage pattern of the client system and source data associated with the one or more devices,
   wherein the first model comprises an unsupervised machine learning model that is trained according to a cosine similarity analysis;
  train, based on the feature data, a second model to identify anomalous API calls that include a client identifier of the client system, wherein the second model comprises a supervised machine learning model that is trained according to a decision tree associated with the feature data;
  receive an API call associated with an acting device accessing an API of the API gateway, wherein the API call includes the client identifier;
  process the API call to identify access information associated with the acting device providing the API call;
  determine, based on the access information and using the second model, that the API call is a potential unauthorized API call;
  obtain, from a verification device, a verification that the API call is unauthorized; and
  perform, based on obtaining the verification, an action associated with the acting device.

9. The non-transitory computer-readable medium of claim 8, wherein the service usage pattern identifies at least one of:
 time patterns associated with receiving corresponding API calls to the one or more APIs; or
 frequencies of receiving corresponding API calls to the one or more APIs during a time period.

10. The non-transitory computer-readable medium of claim 8, wherein the source data identifies at least one of:
 corresponding source addresses of the one or more devices;
 client location information that identifies corresponding locations of the one or more devices; or
 corresponding user information associated with the one or more devices using the one or more APIs.

11. The non-transitory computer-readable medium of claim 8, wherein the one or more instructions, that cause the system to determine that the API call is a potential unauthorized API call, cause the system to:
 cause the second model, based on the access information, to determine whether the acting device is associated with the client system based on at least one of:
  a comparison of client location information identified in the source data and device location information, of the access information, that identifies a location of the acting device; or
  a comparison of client addresses identified in the source data and a device address of the acting device that is identified in the access information.

12. The non-transitory computer-readable medium of claim 8, wherein the one or more instructions, that cause the system to determine that the API call is a potential unauthorized API call, cause the system to:
 compare the access information and the feature data;
 determine, based on comparing characteristics of the access information with corresponding characteristics of the feature data, a probability that the acting device is not authorized by the client system to access the API;

determine that the probability satisfies a threshold probability associated with unauthorized access of the API in association with the client identifier; and determine, based on the probability satisfying the threshold probability, that the acting device accessing the API corresponds to potential anomalous activity.

13. The non-transitory computer-readable medium of claim 8, wherein the one or more instructions, that cause the system to obtain the verification, cause the system to:

send, to the verification device, a request for a user input that indicates whether the acting device is authorized to access the API; and receive the user input from the verification device, wherein the verification is included within the user input.

14. The non-transitory computer-readable medium of claim 8, wherein the one or more instructions, that cause the system to perform the action, cause the system to:

prevent the acting device from further accessing the API gateway;

transmit, to a management device, a notification that indicates that the acting device provided an anomalous API call;

store, in a data structure, the API call in association with an indication that the acting device provided an anomalous API call; or retrain the second model based on the API call.

15. A method, comprising:

obtaining, by a system, service usage training data associated with one or more devices of a client system providing application programming interface (API) calls to one or more APIs associated with an API gateway;

training, by the system and based on the service usage training data, a first model to identify feature data associated with the client system using the one or more APIs, wherein the feature data includes a service usage pattern of the client system and source data associated with the one or more devices, wherein the first model comprises an unsupervised machine learning model that is trained according to a cosine similarity analysis;

training, by the system and based on the feature data, a second model to identify anomalous API calls that include a client identifier of the client system, wherein the second model comprises a supervised machine learning model that is trained according to a decision tree associated with the feature data;

receiving, by the system, an API call associated with an acting device accessing an API of the API gateway, wherein the API call includes the client identifier;

processing, by the system, the API call to identify access information associated with the acting device providing the API call;

determining, based on the access information and using the second model, that the API call is a potential unauthorized API call;

obtaining, by the system and from a verification device, a verification that the API call is unauthorized; and performing, by the system and based on obtaining the verification, an action associated with the acting device.

16. The method of claim 15, wherein the service usage pattern identifies at least one of:

time patterns associated with receiving corresponding API calls to the one or more APIs; or frequencies of receiving corresponding API calls to the one or more APIs during a time period.

17. The method of claim 15, wherein the source data identifies at least one of:

corresponding source addresses of the one or more devices;

client location information that identifies corresponding locations of the one or more devices; or corresponding user information associated with the one or more devices using the one or more APIs.

18. The method of claim 15, wherein determining that the API call is a potential unauthorized API call comprises:

causing the second model, based on the access information, to determine whether the acting device is associated with the client system based on at least one of:

a comparison of client location information identified in the source data and device location information, of the access information, that identifies a location of the acting device; or a comparison of client addresses identified in the source data and a device address of the acting device that is identified in the access information.

19. The method of claim 15, wherein determining that the API call is a potential unauthorized API call comprises:

comparing the access information and the feature data;

determining, based on comparing characteristics of the access information with corresponding characteristics of the feature data, a probability that the acting device is not authorized by the client system to access the API;

determining that the probability satisfies a threshold probability associated with unauthorized access of the API in association with the client identifier; and determining, based on the probability satisfying the threshold probability, that the acting device accessing the API corresponds to potential anomalous activity.

20. The method of claim 15, wherein obtaining the verification comprises:

sending, to the verification device, a request for a user input that indicates whether the acting device is authorized to access the API; and receiving the user input from the verification device, wherein the verification is included within the user input.

* * * * *